United States Patent

[11] 3,560,826

| [72] | Inventors | Robert F. Lonaberger<br>Reading;<br>Charles W. Stickler, Jr., Mohnton, Pa. |
|---|---|---|
| [21] | Appl. No. | 687,733 |
| [22] | Filed | Dec. 4, 1967 |
| [45] | Patented | Feb. 2, 1971 |
| [73] | Assignee | Gray Tech Industries, Inc.<br>Mohnton, Pa.<br>a corporation of Pennsylvania. by mesne assignment |

[54] GRINDING WHEEL CONTROL SYSTEM AND APPARATUS
7 Claims, 4 Drawing Figs.

| [52] | U.S. Cl. | 318/306,<br>51/134.5 |
|---|---|---|
| [51] | Int. Cl. | H02p 7/06,<br>B24b 5/00 |
| [50] | Field of Search | 318/6, 7,<br>460, 306; 73/67—69; 51/106, 168, 165, 134.5 |

[56] References Cited
UNITED STATES PATENTS

| 2,947,121 | 8/1960 | Coes, Jr. | 51/134.5 |
| 2,994,994 | 8/1961 | Lonaberger et al. | 51/134.5 |
| 3,113,405 | 12/1963 | Schneider et al. | 51/134.5 |

Primary Examiner—Oris L. Rader
Assistant Examiner—Robert J. Hickey
Attorney—William J. Ruano ABSTRACT: A control system and apparatus for ultrasonic detection of wear of a grinding wheel and control of the peripheral speed thereof by maintaining it at a constant optimum value for increasing grinding wheel life.

The control apparatus involves a minimum number of parts of relatively simple construction and highly reliable operation, a novel arrangement of ultrasonic sensors and speed-reducing means for a step motor operable to automatically adjust a potentiometer which controls the speed of the drive motor of the grinding machine to automatically compensate for variations in the diameter of the grinding wheel so as to maintain substantially constant peripheral speed of the grinding wheel to increase its efficiency and life.

INVENTORS.
ROBERT F. LONABERGER
CHARLES W. STICKLER, JR.
BY
*William J. Ruano*
ATTORNEY

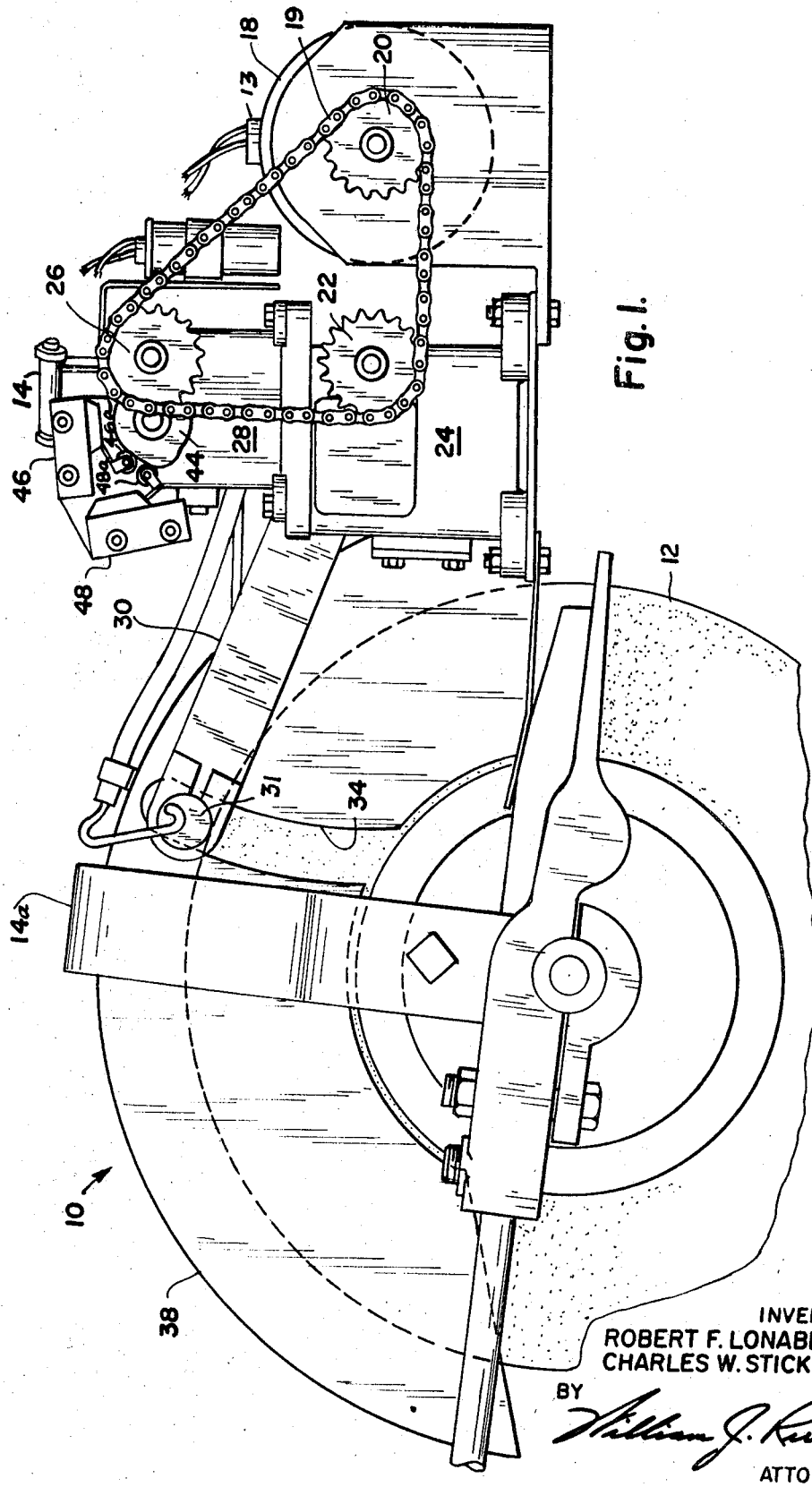

GRINDING WHEEL CONTROL SYSTEM AND APPARATUS

This invention relates to a grinding wheel drive and, more particularly, to control apparatus and means for maintaining a predetermined peripheral grinding speed of the grinding wheel, which speed is maintained at a substantially constant value even though the diameter of the grinding wheel is reduced as the result of wear from working performance, whereby maximum grinding efficiency of the grinding wheel is achieved as well as a substantial increase in the life thereof.

A more specific object of the invention is to provide a novel control means including sensor units controlled either by a light beam falling on a photocell or by an ultrasonic beam passing from a transmitter to a receiver, which beam is normally blocked by the grinding wheel but becomes unblocked as a consequence of wear at the periphery of the grinding wheel, thereby initiating the control circuit for repositioning the sensors until the beam again becomes blocked by the grinding wheel and simultaneously varying the speed of the grinding wheel driving motor for effecting a substantially constant peripheral speed of the grinding wheel.

Another object of the invention is to provide a novel mounting for the said sensor units so that they may be placed very close to the grinding wheel surfaces so as to provide more reliable control.

A still more specific object of the invention is to provide an ultrasonic beam of optimum frequency to provide precise and accurate control and maintenance of the peripheral speed of the grinding wheel at a substantially constant value to greatly increase its efficiency and life.

Another object of the invention is to provide an automatic control system, including a safety relay, to prevent the possibility of an improper, excessive wheel speed to be applied to a full diameter grinding wheel, by automatic return of the control cycle to "minimum" position when a "stop" button is depressed.

Still another object of the invention is to provide a visual indication of the amount of wear of a grinding wheel as indicated by the position of the output shaft of a speed reducer or by the position of the speed-compensating potentiometer.

Other objects and advantages of the invention will become more apparent from a study of the following description, taken with the accompanying drawings wherein:

FIG. 1 is a side, elevational view of a grinding wheel control apparatus embodying the principles of the present invention;

Figure 2:
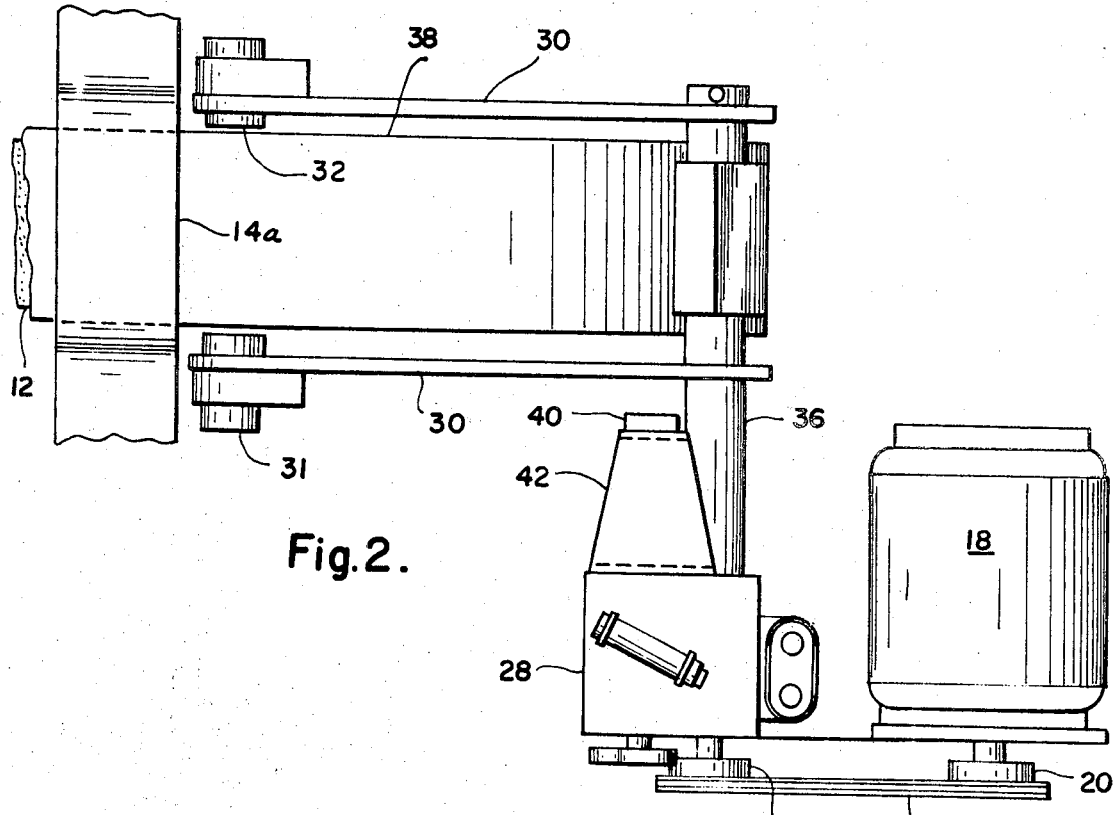
FIG. 2 is a fragmentary top view thereof.
Figure 3:
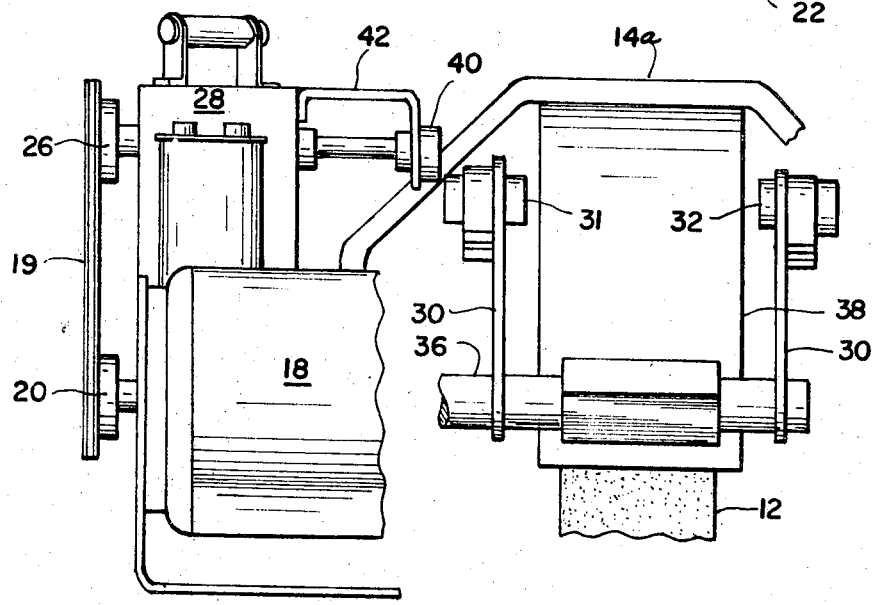
FIG. 3 is a fragmentary side view as viewed from the right of FIG. 2.

Referring more particularly to FIGS. 1, 2 and 3 of the drawing, numeral 10 generally denotes a "swing"-grinding wheel assembly including an inverted U-shaped strap or frame portion 14 and a metallic guard 38, the latter forming a protective enclosure for the top half of the grinding wheel 12. The grinding wheel 12 of abrasive material may be driven by any suitable motor, such as, for example, a direct current drive motor 45 (FIG. 4) through a belt (not shown).

An important feature of the invention resides in the specific construction and arrangement of sensors for detecting peripheral wear of the grinding wheel. Confronting slots 34 (FIG. 1) are provided on opposite surfaces of guard 38 and are disposed along concentric paths. Sensors 31 and 32 are disposed along opposite surfaces of the grinding wheel 12 and are mounted on the ends of sensor-holding arms 30 which are pivotally connnected, at one end, to shaft 36. Sensors 31 and 32 are arranged in confronting relationship with one sensor, such as 32, transmitting a radiant energy beam or signal and the other sensor 31 serving as a receiver of the signal. Such signals can be a light beam which originates in the transmitter 32 and is directed towards a receiver 31 which includes a photocell, (or vice versa).

The slots 34 also ventilate guard 38 to provide a more equalized cooling of the grinding wheel 12 when it is stopped. The abrasive action of the wheel creates heat and damage to the wheel in the confined area of the guard 38.

A more effective arrangement is to provide an ultrasonic sensing combination comprising an ultrasonic generator or transducer 32 and a receiver 31 for the ultrasonic beam. A very effective and optimum ultrasonic frequency is 38,000 cycles per second although this may be increased or decreased by about 500 cycles for optimum operation.

The sensors 31 and 32 are turned by arms 30 about shaft 36 as a pivot so as to move precisely along slots 34 formed in the guard 38. Such pivotal movement is at a very slow speed which is obtained by speed-reducing means coupled to a drive motor. More specifically, an AC step motor 18 is provided as the primary source of motive power which drives a gear 20 which, in turn, drives gears 22 and 26 by means of a chain 19. Gear 22 drives a speed reducer 24 having a speed ratio of about 900 to 1. As will be noted more clearly in FIG. 2, the speed reducer 24 drives the output shaft 36 so as to pivot arms 30 and move sensors 31 and 32 along slots 34 at very slow speed. Gear 26 drives a similar speed reducer 28 having a ratio of about 100 to 1. As will appear more clearly in FIG. 3, speed reducer 28 has an output shaft, supported by a mounting bracket 42, which drives and adjusts a potentiometer 40, which is varied at a very slow speed in accordance with the speed reduction ratio of speed reducer 28 and is for the purpose of varying the energy input of the shunt field 45a of a direct current driving motor 45 (FIG. 4), or varying energy input into any other suitable motor and/or transmission drive of the grinding wheel, such as a hydraulic drive wherein a suitable valve may be substituted for the potentiometer 40 to vary the driving speed.

Speed reducer 28 has an output shaft, driven at highly reduced speed, which drives a cam 44 which, in turn, drives a minimum speed limit switch 48 and a maximum speed limit switch 46 (FIG. 1) which are operated by pins or wheels 48a and 46a, respectively, rolling on the surface of cam 44. The limit switches restrict the movement of the potentiometer 40 and the sensor arm travel to a predetermined range.

The relationship of the train of movement energized by the step motor 18 and speed reducers 24 and 28 is such that the maximum travel of the sensor holder arms 31, 32 occurs during the same interval of time as the maximum rotational movement of the shaft on which the potentiometer 40 is mounted.

Figure 4:
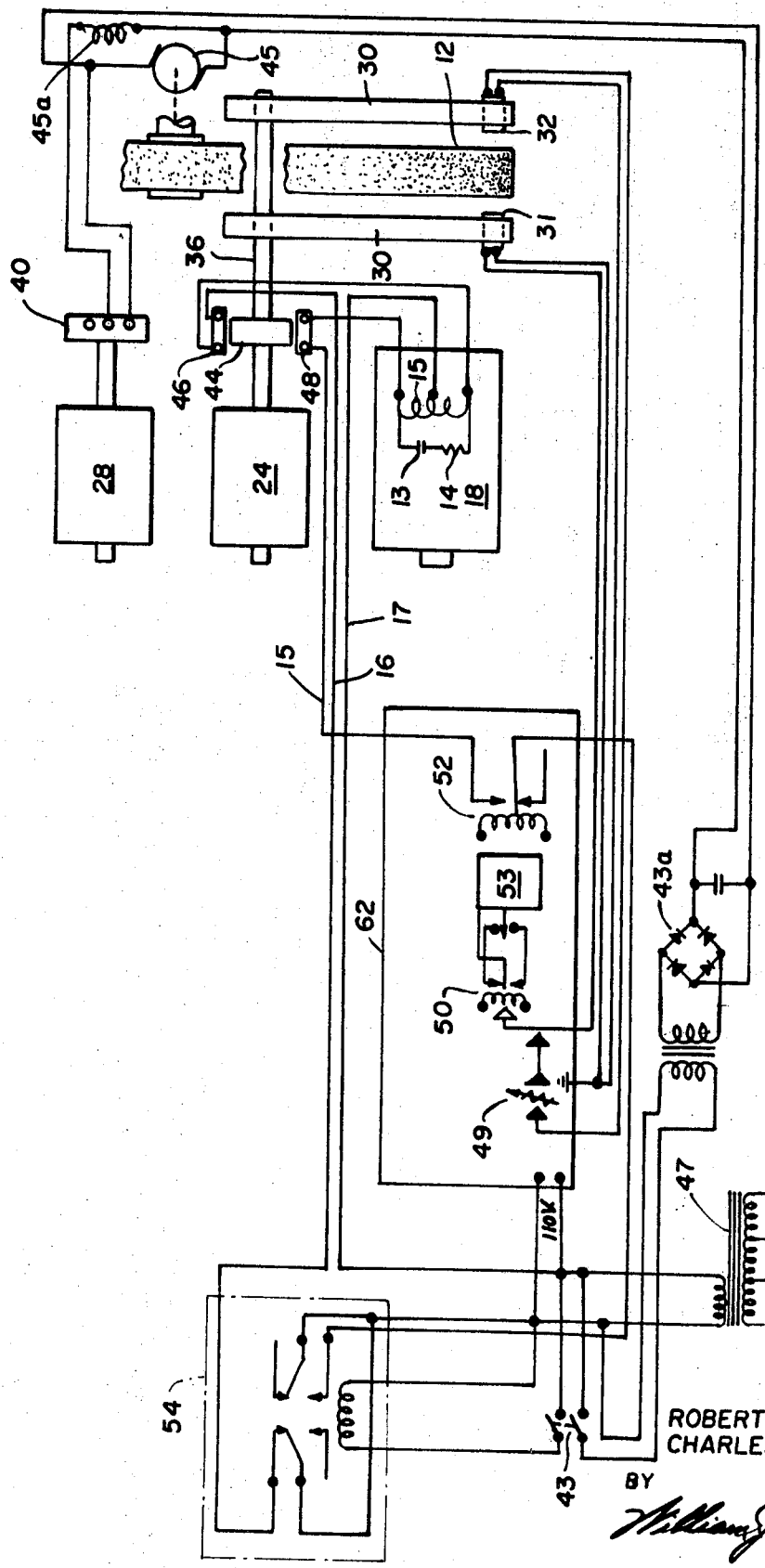
FIG. 4 is a schematic view of the electrical control system embodying the apparatus of FIGS. 1, 2 and 3.

FIG. 4 is a circuit diagram of the elements shown in FIGS. 1 to 3, inclusive. The AC step motor 18 is illustrated in its component parts and comprises windings 15 and a phase shifting network comprising capacitor 13 and resistor 14. Bidirectional rotation is obtained by selectively applying a single phase AC source, through conductors 15, 16 and 17, to either side of windings 15 on step motor 18. Step motor 18 is a synchronous stepping motor, that is, a permanent magnet AC motor having extremely rapid starting, stopping and reversing characteristics and a slow basic shaft speed synchronized by line frequency.

Block diagram 62 generally denotes the control amplifier for the sensors 31 and 32. The sensors 31 and 32 are connected by conductors as shown to a gain control, denoted generally by numeral 49, thence to a transfer relay 50 and thereafter to an adjustable time delay circuit 53 and finally to an output relay 52. Through base terminals and conductor 15, together with conductors 16 and 17, the output of the control amplifier 62 is applied to the step motor 18. Primary input energy, such as 110 volts, is through line terminals off of transformer 47, or direct from a primary source.

In operation, assume that the sensors 31, 32 are initially placed so as to allow the light or ultrasonic beam to travel therebetween. The beam is "established", that is, the amplifier gain exceeds loss in the acoustic path between the sensors, therefore the system oscillates. This causes the output relay 52 to function which, in turn, initiates starting of the step motor 18.

The AC step motor 18 while, driving through speed reducer 28, will rotate the movable arm of potentiometer 40 at slow speed and simultaneously move the sensor arms 31, 32 downwardly, which rotation will continue until the grinding wheel 12 blocks the beam. Such blocking causes the ultrasonic unit of stepping motor 18.

As the wheel wears away in the abrasive process, the cycle repeats as increments of wear occur to open the beam path and the adjustment of the potentiometer 40 will continue until limit switch 46 is opened to interrupt the circuit and stop rotation of the step motor 18. The limit switch 46, for example, may be denoted as "down" limit switch and the limit switch 48 may be considered the minimum or "up" limit switch.

As the result of rotation of the step motor 18 and the speed reducer 28, the shaft of potentiometer 40 is rotated at very slow speed so as to vary the potentiometer setting and alter the input of the shunt field 45a of the direct current drive motor 45, or other suitable drive, of the grinding wheel so as to increase its speed in increments as the periphery of the grinding wheel becomes diminished so as to compensate for the reduction in diameter of such wheel 12. The position of the potentiometer 40 serves as a visual indication of the amount of wear of grinding wheel 12. It may be used also to feed a recorder (not shown).

Depressing the "stop" button 43 causes the circuit 43a primary direct current source to open and at the same instant relay circuit 54 to open, thereby cutting off input energy into the grinding wheel drive motor 45. The relay 54 initiates the upward movement of the sensor-holding arms 30 through energization and reverse rotation of the step motor 18, also opens the "downward" circuit, eliminating possible false pulses in the circuit, thereby returning the potentiometer 40 and the sensors 31, 32 to minimum speed position "up" as limited by the minimum limit switch 48.

Again when the "start" button 43 is depressed, the circuit operates reversely and relay 54 opens the "upward" circuit eliminating possible false pulses. Input energy from primary direct current source 43a obtained from a full wave rectifier is circuited into the shunt field 45a of the direct current motor 45 to drive the grinding wheel 12 at minimum low speed. The amplifier 62 is preset for a time delay of input energy to the step motor 18 of a few seconds duration to allow the drive motor 45 to reach minimum, predetermined rotational speed. Input energy into the step motor 18 then causes movement of the sensor arm assembly to position the sensors at the periphery of the grinding wheel 12 and the potentiometer 40 is positioned at the same time to give increased input to the shunt field of the direct current motor drive 45, thereby increasing the grinding wheel speed. Maximum speed is governed by the maximum limit switch 46.

The safety relay 54 functions to prevent the possibility of an improper and excessive wheel speed being applied to new, full diameter grinding wheels by automatic return of the control cycle to minimum position when the "stop" button 43 is depressed. The speed-limiting relay 54 functions automatically when the "start" button 43 is depressed and the control cycle returns the sensors to proper operating position at the periphery of the grinding wheel 12.

The present invention is not necessarily restricted to grinding wheels. It may be applied to work being turned on a lathe. The sensors would measure the work and increase the lathe turning speed to conform to work diameter reduction and thus maintaining the peripheral cutting speed at an optimum value for the tooling.

The present invention can be assembled with components necessary to meet available power input. Insofar as it operates on a power source independent of the input characteristics of the drive motor, it can be furnished in various combinations of cycles and voltages common to various areas of the world, such as 50/60 cycle or 110/volts, etc.

While two separate speed reducers 24 and 28 are described, it is possible to use a single speed reducer having various output shafts running at slow and possibly different speeds for turning potentiometer 40 and cam 44.

Thus it will be seen that we have provided an efficient control system and apparatus for maintaining substantially constant peripheral speed of a grinding wheel irrespective of variations in diameter as a consequence of wear, and which is responsive to an ultrasonic or light beam emanating from uniquely disposed sensors in very close proximity to the faces of the grinding wheel to enable very accurate detection of the amount of wear of the wheel and to permit very accurate response and operation of a control system so as to faithfully maintain the peripheral speed at a substantially constant value irrespective of such wear.

While we have illustrated and described a single specific embodiment of our invention, it will be understood that this is by way of illustration only, and that various changes and modifications may be made within the contemplation of our invention and within the scope of the following claims.

We claim:

1. In combination, a rotatably mounted wheel whose diameter is progressively decreased as the result of a working operation, drive means for rotating said wheel, an ultrasonic transmitter and receiver units mounted on opposite sides of said wheel for projecting an ultrasonic beam transversely of its periphery and which beam is normally blocked by a peripheral portion of the wheel and becomes unblocked as a consequence of a predetermined reduction of the diameter of the wheel, speed control means responsive to said ultrasonic beam and including a reversible motor, speed-reducing means driven by said motor, pivotal means driven by said speed reducing means for slowly moving said ultrasonic transmitter and receiver units substantially radially of said wheel, a cam driven by said speed-reducing means, a pair of limit switches operated by said cam for limiting rotational movement of said motor in opposite directions, a potentiometer which is mounted on and slowly driven by said speed-reducing means to progressively increase the speed of said driving means in response to reductions in diameter of said wheel and to give a visual indication of the speed of said wheel.

2. The combination recited in claim 1 together with electrical-switching means for automatically driving said pivotal means to its initial position after predetermined wear of the wheel for reducing the speed of said driving means to its minimum value before restarting the control of the speed of another full diameter wheel.

3. The combination recited in claim 1 wherein said wheel is a grinding wheel having a guard surrounding a portion of said grinding wheel, confronting arcuate slots formed on opposite sides of said guard and wheel, said pivotal means slowly pivoting said ultrasonic transmitter and receiver units along said respective slots, said limit switch means limiting movement of said pivotal means in opposite directions.

4. The combination recited in claim 1 together with electrical-switching means for automatically reducing the speed of said driving means when a new full diameter wheel is to be controlled.

5. The combination recited in claim 1 wherein said ultrasonic beam is at a frequency of about 38,000 cycles per second.

6. The combination recited in claim 1 wherein said ultrasonic beam is at a frequency in the range of between 37,500 to 38,500 cycles per second.

7. The combination recited in claim 1 wherein said wheel is a grinding wheel having a guard surrounding a portion of said grinding wheel, confronting arcuate slots formed on opposite sides of said guard and wheel, said pivotal means slowly pivoting said ultrasonic transmitter and receiver units along said respective slots.